(12) United States Patent
Bauer et al.

(10) Patent No.: US 11,901,547 B2
(45) Date of Patent: Feb. 13, 2024

(54) METHOD FOR PRODUCING A PRECURSOR MATERIAL FOR AN ELECTROCHEMICAL CELL

(71) Applicant: Robert Bosch GmbH, Stuttgart (DE)

(72) Inventors: Harald Bauer, Ehningen (DE); Wolfgang Weydanz, Buckenhof (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 17/311,405

(22) PCT Filed: Dec. 3, 2019

(86) PCT No.: PCT/EP2019/083486
§ 371 (c)(1),
(2) Date: Jun. 7, 2021

(87) PCT Pub. No.: WO2020/115040
PCT Pub. Date: Jun. 11, 2020

(65) Prior Publication Data
US 2022/0123281 A1     Apr. 21, 2022

(30) Foreign Application Priority Data
Dec. 5, 2018 (DE) .................... 10 2018 221 017.9

(51) Int. Cl.
*H01M 4/00* (2006.01)
*H01M 4/1393* (2010.01)
*H01M 4/62* (2006.01)

(52) U.S. Cl.
CPC ......... *H01M 4/1393* (2013.01); *H01M 4/622* (2013.01); *H01M 4/625* (2013.01)

(58) Field of Classification Search
CPC .... H01M 4/621; H01M 4/139; H01M 4/1393; H01M 4/625; H01M 4/622; Y02E 60/10
See application file for complete search history.

(56) References Cited

U.S. PATENT DOCUMENTS

| 7,662,424 B2 | 2/2010 | Kurihara et al. |
| 2005/0064096 A1 | 3/2005 | Kurihara et al. |

(Continued)

FOREIGN PATENT DOCUMENTS

| CN | 105185965 A | * | 12/2015 | ............. H01M 4/13 |
| CN | 107834019 A | | 3/2018 | |

(Continued)

OTHER PUBLICATIONS

Huang et al. A Flexible Carbon-sulphur For Lithium-suphur Battery Composite Anode Material, Dec. 2015, See the Abstract. (Year: 2015).*

(Continued)

*Primary Examiner* — Cynthia H Kelly
*Assistant Examiner* — Monique M Wills
(74) *Attorney, Agent, or Firm* — Michael Best & Friedrich LLP

(57) ABSTRACT

The present invention relates to a method for producing a precursor material (10) for an electrochemical cell. The method comprises the steps of adding a matrix material (18) to a fluidized bed (40), and adding a carrier medium (48) and a de-agglomerated carbon nanotube material (22) to the fluidized bed (40), so that the carbon nanotube material (22) and the carrier medium (48) is applied to the matrix material (18) and the latter is granulated therewith, wherein the carbon nanotube material (22) has been suspended and de-agglomerated prior to addition to the carrier medium (48), and/or the carbon nanotube material (22) present in de-agglomerated form in the fluidized bed (40) dissolving with the carrier medium (48) in the fluidized bed (40).

10 Claims, 3 Drawing Sheets

(56) References Cited

U.S. PATENT DOCUMENTS

2013/0295451 A1    11/2013  Miki
2017/0271652 A1*    9/2017  Harutyunyan ........ H01M 4/587
2019/0036103 A1     1/2019  Pierce et al.

FOREIGN PATENT DOCUMENTS

| CN | 108232111 | A |   | 6/2018  |             |
|----|-----------|---|---|---------|-------------|
| CN | 108842140 | A | * | 11/2018 | ... C23C 16/26 |
| JP | 2003059492 | A |   | 2/2003  |             |
| JP | 2004348975 | A |   | 12/2004 |             |
| WO | 2012157046 | A1 |  | 11/2012 |             |
| WO | 2013168785 | A1 |  | 11/2013 |             |
| WO | 2018146865 | A1 |  | 8/2018  |             |

OTHER PUBLICATIONS

Lv et al. A System And Method Of Carbon-coated Modified Lithium Ion Battery Anode Material, Nov. 2018, See the Abstract. (Year: 2018).*

International Search Report for Application No. PCT/EP2019/083486 dated Feb. 20, 2020 (English translation, 2 pages).

* cited by examiner

METHOD FOR PRODUCING A PRECURSOR MATERIAL FOR AN ELECTROCHEMICAL CELL

BACKGROUND OF THE INVENTION

The present invention relates to processes for producing a precursor material for an electrochemical cell, a precursor material and an electrochemical cell which comprises such a material.

Innovative materials and processes are required today for the production of electrical layers having good conductivity. Thus, for example, carbon nanotubes (CNT) are used as additives for significantly increasing the electrical conductivity of thin functional layers. Here CNTs can include all shapes of carbon tubes or carbon fibers, including "multi-wall" and "single-wall" carbon nanotubes, carbon fibers or any doped carbon fibers. The dimensions thereof can range from diameters of 10 nm up to 100 µm. The length can range from 100 nm up to 1000 µm or above. The materials used can likewise encompass other conductive fibers, e.g. metal fibers or BC, BN or BNC fibers (boron carbide, boron nitride and boron carbonitride fibers). They are particularly suitable for being able to form a network of conduction paths in the functional layer due to their fiber structure. Thus, carbon nanotubes (CNT) can dramatically increase the electrical conductivity of such layers. This can also give an increased value especially for electrodes in fuel cells and batteries or other electrochemical systems.

U.S. Pat. No. 7,662,424 B2 indicates a way of achieving a homogeneous distribution of the starting materials and bonding of active material and polymer by means of a fluidized-bed coating/agglomeration step. The binder here can be a polymer or an ionically conductive polymer.

US2013/0295451A1 discloses a process for producing a granular material. The granular material contains a plurality of lithium ion conductors and a plurality of active materials. The process comprises the step of uniformly mixing the granular material with a solid electrolyte. In addition, US2013/0295451A1 also discloses a solid-state battery electrode which comprises such a granular material.

The process disclosed in US2005/0064096 A1 comprises the steps of applying and drying a starting material solution to particles by spraying the starting material solution into a fluidized bed. The solvent is subsequently removed from the starting material solution which adheres to the surfaces of the particles. In a next step, the particles are adhesively bonded to one another by means of the binder.

One of the problems occurring when using CNTs is that they are at present still relatively expensive, although their price has decreased significantly in recent years as a result of the development of new production processes. A further problem which still exists and is largely unsolved is the strong tendency of the CNTs to form agglomerates. They tend to assemble into clumps or agglomerates which stands in the way of formation of a network having very good electrical conductivity and significantly increases the amount of CNT material which has to be used. Apart from the resulting price disadvantage, this also means a loss of energy density and conductivity compared to an equivalent thin layer which contains/would contain the CNTs in well dispersed form.

Typically, all dry powders are suspended in a solvent and a slurry is produced therefrom in the production of electrodes for energy stores, specifically coated battery electrodes. The solvent serves as carrier medium for all dissolved and suspended materials in the slurry process. The slurry is used for applying the electrode material to metal foils. In order to ensure the fluidity of the slurry, the amount of solvent has to correspond approximately to the amount of active material. The amount of active material is typically greater than 90% by weight in battery electrodes, while in the case of fuel electrodes the proportion of graphite is greater than 70% by weight. The balance to a total amount of 100% is made up of polymer binders and conductive additives, including carbon nanotubes, and also other additives. In the subsequent drying of the electrodes, the solvent has to be removed again thermally, which is associated with a high energy consumption and thus high process costs and outlay of time.

In solvent-containing liquid compositions, it is readily possible to deagglomerate the CNTs. However, this state has to be effectively "maintained" up to the film and must not be "lost" on drying or further processing. The objective must be for the deagglomerated CNTs to be dispersed in the slurries and then be incorporated in this state in the layer or electrode.

In the largely solvent-free electrode preparation, a stock solution is applied to the active material. The active material is preferably initially charged dry and the stock solution contains only a very small amount of solvent in which only the remaining constituents to make up 100% of the total dry quantity are present. These are all or abovementioned electrode constituents of the <10% of materials such as conductive additive, additives and electrolyte salt. As a result of spraying of the stock solution onto the active material, the materials combine very homogeneously to form a precursor material. This stock solution can contain, inter alia, part of the polymer and optionally also conductive carbon black, CNT and possibly electrolyte salt. However, compared to solvent coating, only a fraction of the solvent (1-30%) is therefore required. This results in a significant cost advantage compared to the solvent-containing electrode preparation. The finished mixture (precursor material) can then simply be rolled between two calender rolls to produce an electrode.

SUMMARY OF THE INVENTION

It is therefore an object of the present invention to provide a process for producing a precursor material for an electrochemical cell, by means of which a higher energy density and conductivity is possible and the corresponding process makes do with far less solvent.

The object is achieved by a process for producing a precursor material for an electrochemical cell according to the invention.

The invention provides a process for producing a precursor material for an electrochemical cell. The process comprises the steps of introduction of a matrix material into a fluidized bed and introduction of a carrier medium and a deagglomerated carbon nanotube material into the fluidized bed so that the carbon nanotube material is applied together with the carrier medium to the matrix material and the latter is granulated therewith, where the carbon nanotube material has been suspended and deagglomerated in the carrier medium before introduction and/or the carbon nanotube material present in deagglomerated form in the fluidized bed dissolves with the carrier medium in the fluidized bed.

The matrix material is, for example, battery electrode active material or graphite for fuel cell electrodes. For the purposes of the invention, the term introduction refers to any possible way known from the prior art, for example injection or spraying-in of the carrier medium, by means of which the corresponding material can be transported into the fluidized bed. The term deagglomerated refers to a state in which more than 50% of the corresponding material is present as individualized fibers or in bundles of not more than 10 fibers. In particular, more than 70% of the material is present as individualized fibers. The material is preferably present to an extent of more than 90% and particularly preferably more than 95% as individualized fibers.

In the granulation process, the liquid droplets of the carrier medium are applied together with the deagglomerated carbon nanotubes in the swirling cloud of matrix material to one or more matrix material particles. The subsequent vaporization of the liquid leaves the constituents from the carrier medium adhering to the matrix material particle/particles with a reduced amount of liquid. As a result, the carbon nanotubes are bound to one or more matrix material particles.

The advantage of the invention is that the prior deagglomeration in the carrier medium makes it possible to achieve a more homogeneous distribution of the carbon nanotube material on the matrix material than when the carbon nanotube material has been mixed without carrier medium, i.e., for example, dry, with the matrix material. This makes a higher energy density and a higher conductivity possible. In addition, less carbon nanotube material is required due to the more homogeneous distribution, so that, because of the high costs of the carbon nanotube material, the costs for production of the precursor material can be significantly reduced.

The carbon nanotube material is preferably deagglomerated by means of suitable apparatuses, e.g. by means of shear forces during transport through nozzles or through mixing or milling apparatuses or by impact forces or combinations thereof as occur in jet mills, countercurrent mills, on flow onto impingement plates. The deagglomeration can here consist of a plurality of steps, for example large agglomerates are pre-deagglomerated dry in a first step and are subsequently wet-deagglomerated in the carrier medium in a second step.

As carrier medium, preference is given to using, for example, water or a suitable organic solvent such as ethanol (or another alcohol), acetone, acetonitrile, gamma-butyrolactone, cyclohexanone. The solvent can likewise be water. Carbon nanotubes are present in suspended form in the carrier medium, and optionally added binder material such as polyvinylidene fluoride (PVDF) or else polyvinylpyrrolidone (PVP) or carboxymethyl cellulose (CMC) can be suspended or dissolved or partially dissolved in the carrier medium.

The advantage of the solvent is that the carbon nanotube material can be deagglomerated particularly easily in the solvent of a stock solution. Here, introduction into a liquid or melt can reduce the van der Waals interactions between the individual carbon nanotube fibers so that the fibers separate more easily from one another in wet deagglomeration.

A further advantage compared to the entirely solvent-free introduction of the carbon nanotube material into the dry electrode mixture is that the hazard potential of the nanosize carbon nanotube material is more easily manageable or significantly less in a solution compared to the dry state (avoidance of dust exposure).

If a paddle mixer into which the carrier medium is introduced together with the carbon nanotubes is used instead of a moving bed/fluidized bed, precursors which have a wider scatter of the particle size result from the process in the paddle mixer compared to the fluidized-bed process. If electrode films are pressed from precursor mixtures having a wide particle size distribution, more nonuniform electrode films which have a greater number of defects and a poorer performance in respect of energy density and life result therefrom. In addition, the particles in the fluidized bed can be dried more gently compared to the paddle mixer or be mixed more quickly with other particles.

In a preferred embodiment of the invention, active material particles or solid particles are used as matrix material. The active material can, for example, be provided as intercalation material for the production of battery electrodes. The carbon nanotube material adheres as individual fibers to the active material powder, with the fibers being applied in all directions in space to the particles. The attachment of the carbon nanotube material to the active material stabilizes the structure, i.e. especially the individualized fibers.

In a further, preferred embodiment of the invention, at least one polymer and/or a binder is dissolved in the carrier medium before introduction. The carbon nanotube material which has been granulated on the matrix material is adhesively bonded by means of the binder, which can also represent only a partial amount of the total binder material required. This results in stronger bonding of the carbon nanotube material to the matrix material and the matrix material particles are also bound more strongly to one another. A precursor material having mechanically better cohesion can be produced in this way.

In respect of the desired total amount of an ionically conductive polymer in an electrode matrix, it can be advantageous to incorporate at least a small proportion of this polymer matrix as binder into the carrier medium. It is not necessary here to dissolve the total amount of the ionically conductive polymer or the binder polymer.

For the polymer polyethylene (PE), polypropylene (PP) and/or polystyrene (PS), the solvent is preferably acetone, toluene, xylene, trichlorobenzene and/or tetrahydronaphthalene or can comprise these solvents. The solvent for dibutyl phthalate (DBP) can comprise or be n-hexane. For the polymer polyvinylidene fluoride (PVDF), it is possible to use acetone, gamma-butyrolactone (GBL), cyclohexanone or N-methylpyrrolidone (NMP), while GBL can likewise be suitable for acrylonitrile-butadiene-styrene (ABS) or acrylates.

In an advantageous embodiment of the invention, an electrolyte salt is dissolved together with the at least one polymer in the carrier medium before introduction. In order to ensure ionic conductivity by addition of lithium ions, these are mixed with electrolyte salts such as $LiPF_6$, LiBOB or LiTFSI.

Preference is given to adding an electrolyte salt during or after granulation. Since PEO (polyethylene oxide), in particular, becomes sticky as a result of dissolution in the polymer matrix when LiTFSI is added, as a result of which transport of the powder is made difficult, the electrolyte salt and the main amount of the polymer are added only after granulation in the process of (electrode) film production via, for example, a solids mixing nozzle in the calender gap in film production. It has been found that the PEO can be added particularly advantageously during granulation and the addition of LiTFSI alone at a later point in time, i.e., for example, during mixing before the calender gap, is not disadvantageous since LiTFSI is distributed effectively spontaneously (driving force is concentration gradients) by diffusion into the PEO matrix. The pressed electrode thus becomes sticky after a certain time, which can be advantageous on lamination with metallic power outlet lead foils or generally in the assembly of rechargeable lithium ion batteries.

In an advantageous further development, a surface of the carbon nanotube material and of the matrix material is modified before introduction into the fluidized bed. Depending on the surface modification of the carbon nanotube material and the active material, it may not be necessary to use any binder. As a result of the modification of the surfaces, cohesion of the particles in the precursors can, for example, be achieved merely by van der Waals forces. Binder is saved in this way.

A further amount of polymer is advantageously added after granulation. This amount of polymer is added with solvent or without solvent after granulation. If only part of the polymer is dissolved, only a significantly smaller amount of solvent (e.g. 3-20%) than in production of a slurry (solids solution in solvents) with the total polymer in the dissolved state is required. Solvent can be saved in this way.

A precursor material for an electrochemical cell is also proposed, where the precursor material comprises a matrix material to which a carbon nanotube material has been applied to a surface and the carbon nanotube material is distributed between particles of the matrix material so homogeneously that an agglomerate- and/or clump-free surface structure is formed. As a result, the individual active material/matrix material particles are electrically conductively connected to one another by the carbon nanotubes. On pressing of the precursors together with one another, they are electrically conductively connected and make a smooth surface structure of the electrode possible.

An agglomerate- and/or clump-free surface structure means that the carbon nanotube particles are "unfolded" and are attached to the surface by at least one end, so that at least the second end or another part of the CNT particle is attached to at least one further matrix material particle and can increase the electrical conductivity of an electrode produced therewith.

In a preferred embodiment, the matrix material is an active material, or the matrix material is made up of solid particles. The active material is, for example, the material of a (battery) electrode. The solid particles are, for example, intended for a functional layer of a gas diffusion electrode of a PEM fuel cell. The advantages mentioned for the corresponding step in the process can be achieved thereby.

At least one polymer has advantageously been applied to the surface of the matrix material. The polymer has in this case been at least partially applied. The polymer enables the advantages mentioned above for the corresponding step in the process to be achieved.

In a preferred further development, an electrolyte salt has been applied to the surface of the matrix material. As mentioned above in the context of the process, the conductivity for ions in the film produced later can be adjusted by means of the electrolyte salt.

In addition, an electrochemical cell which comprises a precursor material produced by the process of the invention or contains the precursor material of the invention is proposed. Such an electrochemical cell has the advantages mentioned for the process.

BRIEF DESCRIPTION OF THE DRAWINGS

A working example of the invention is depicted in the drawing and explained in more detail in the following description. The drawing shows.

DETAILED DESCRIPTION

Figure 1:
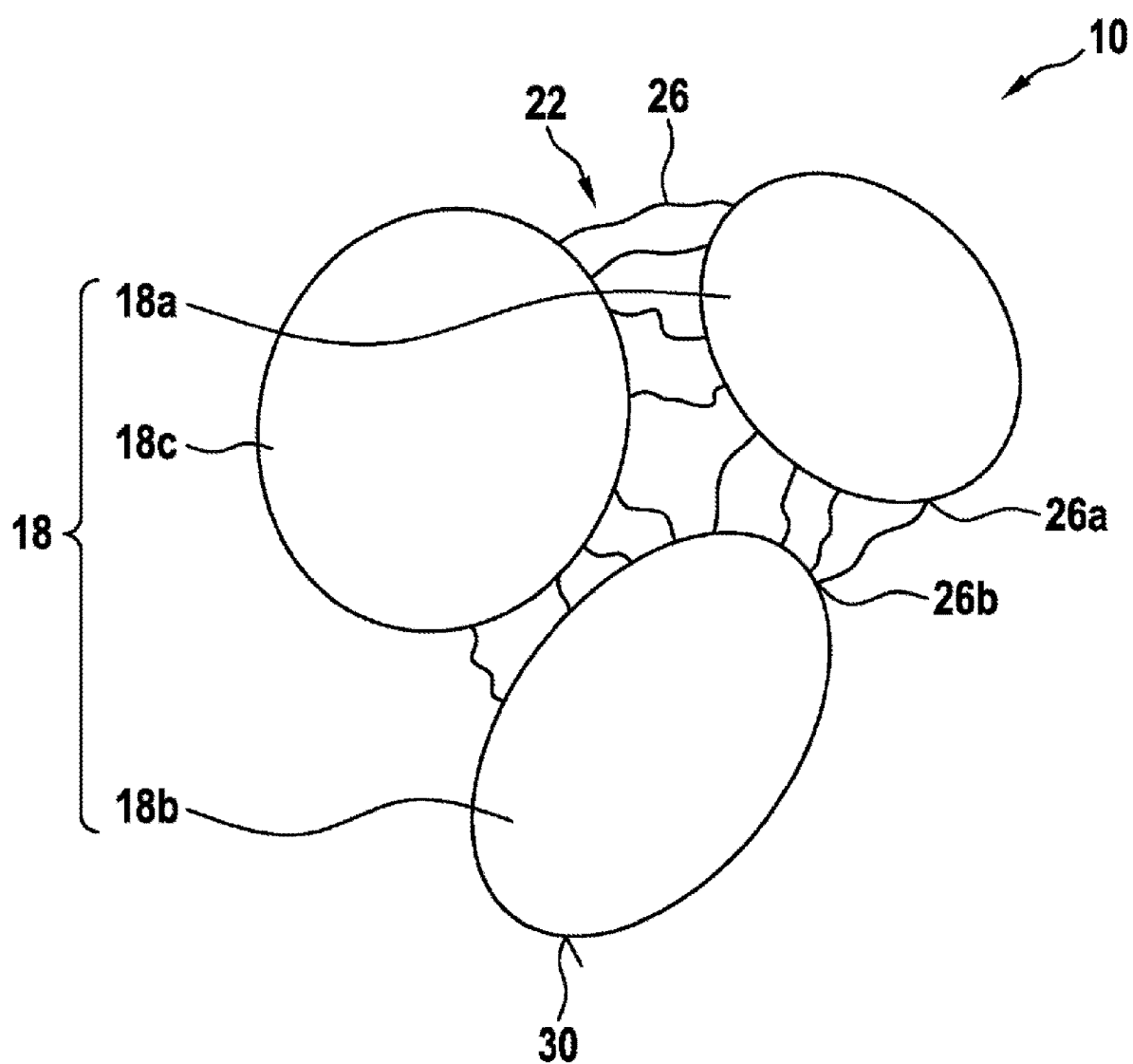
FIG. 1 enlarged section of the precursor material of the invention, with the carbon nanotube material distributed homogeneously between particles of the matrix material, FIG. 2 a first working example of the process of the invention for producing the precursor material, and FIG. 3 a second working example of the process of the invention for producing the precursor material.

FIG. 1 shows an enlarged section of a precursor material 10 according to the invention with the carbon nanotube material 22 distributed homogeneously between particles 18*a*, 18*b*, 18*c* of the matrix material 18. The carbon nanotube material 22 is in the form of individual carbon nanotube particles 26 which extend between at least two particles 18*a*, 18*b*, 18*c* of the matrix material 18. The carbon nanotube particles 26 are thus, for example, joined by a first end 26*a* to a surface 30 of a first particle 18*a* and by a second end 26*b* to the surface 30 of a second particle 18*b*, so that the electrical conductivity of the electrode is increased and an agglomerate- and/or clump-free surface structure is formed.

Figure 2:
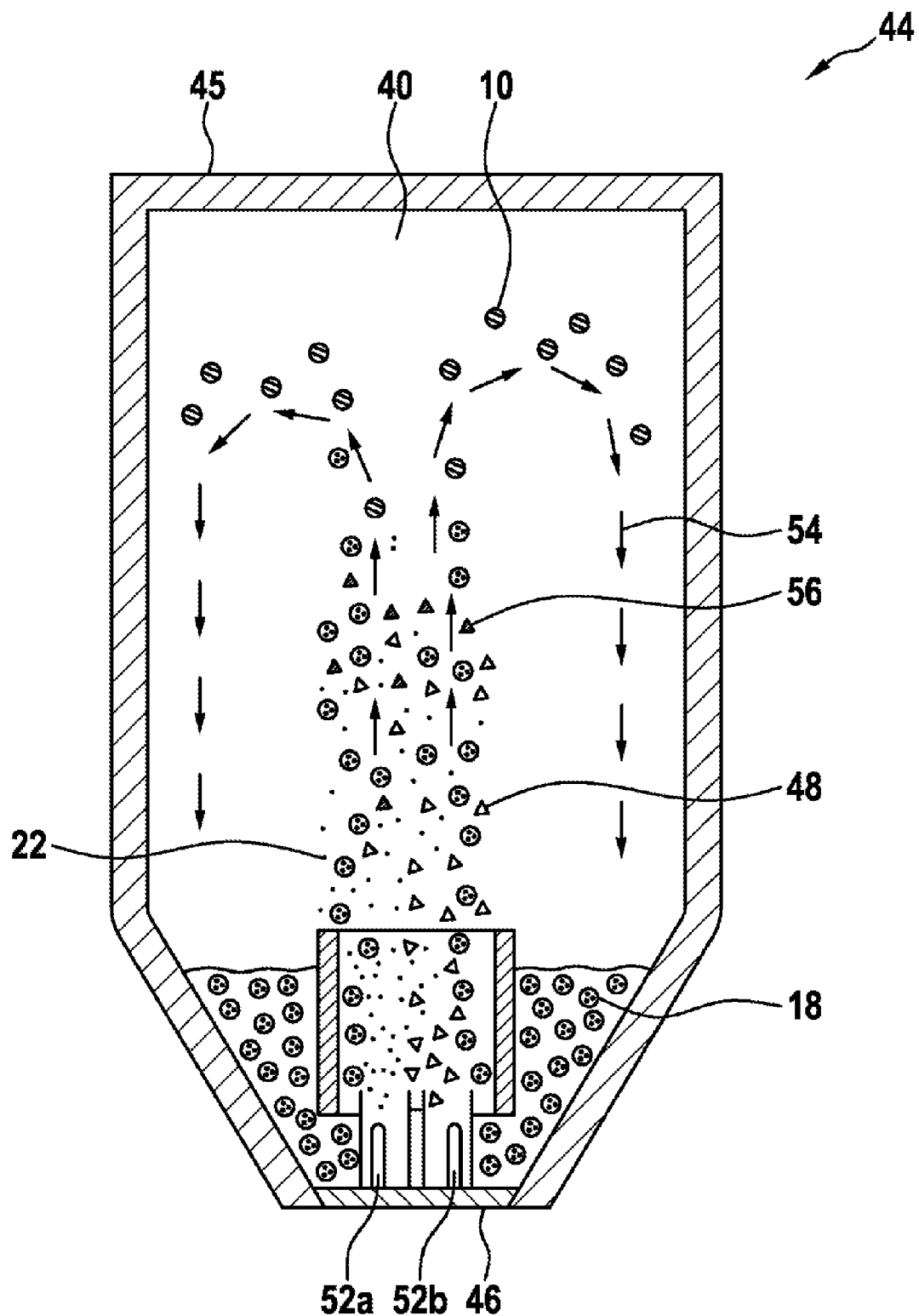
Figure 3:
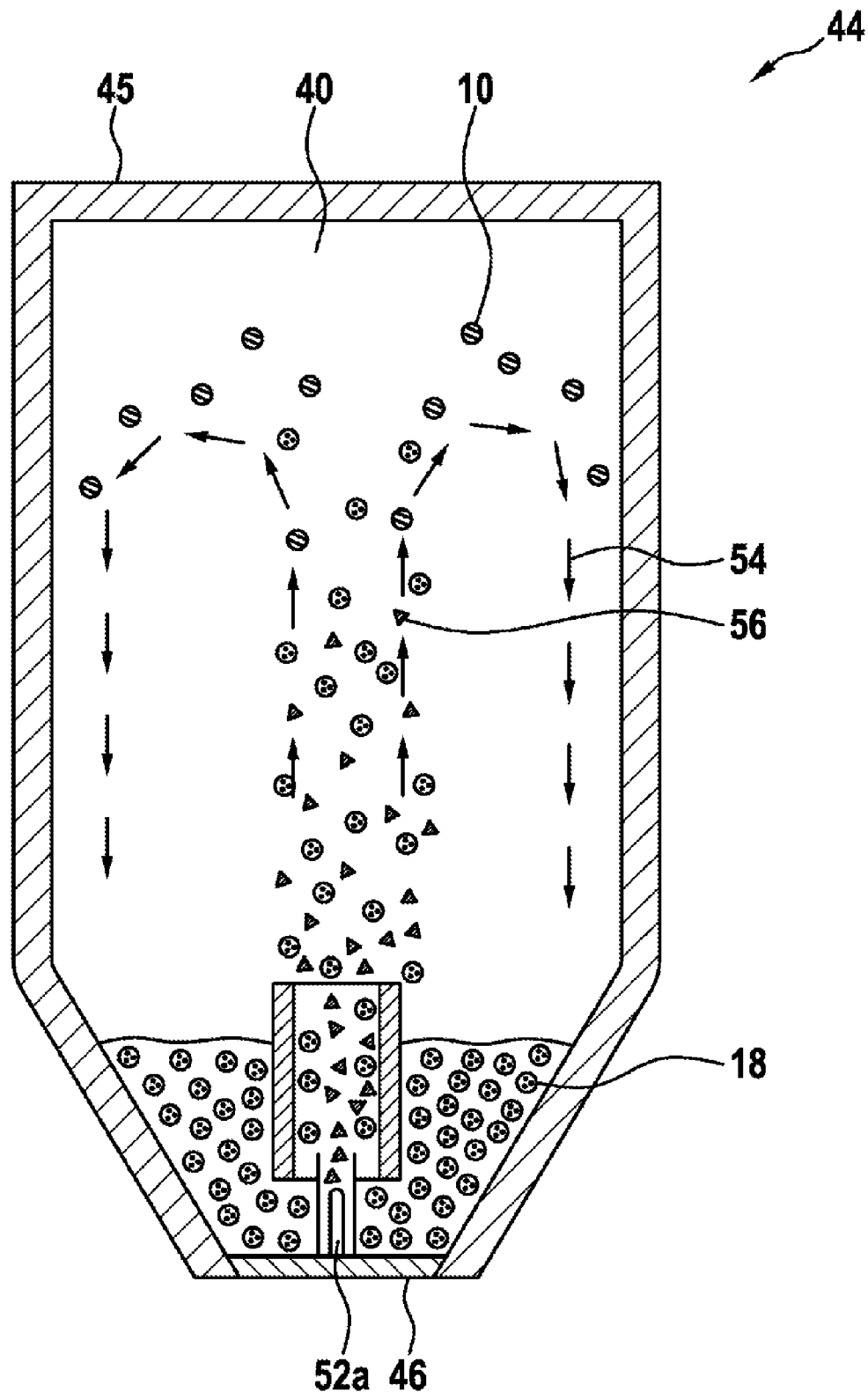

FIG. 2 shows a first working example of the process of the invention for producing the precursor material 10. In this process, the matrix material 18 is introduced into a fluidized bed 40 of a fluidized-bed reactor 44 in a first step (not shown). Such a fluidized-bed reactor 44 can be a fluidized-bed reactor 44 known from the prior art. The fluidized-bed reactor 44 is formed essentially by a vessel 45 which is closed at the bottom by a perforated plate 46 on which the matrix material 18 has been placed.

In a second step, the deagglomerated carbon nanotube material 22 is introduced via a nozzle 52*a* and the carrier medium 48, which is preferably a solvent, is introduced via a nozzle 52*b* into the fluidized bed 40 at high speed through at least one of the nozzles 52*a*, 52*b*. In the fluidized bed 40, the matrix material 18 is picked up by the flows exiting from the nozzles 52*a*, 52*b* and circulates in normal circular movements 54 in the vessel 45. The carbon nanotube material 22 introduced is firstly picked up by the carrier medium 48 in the spatial vicinity of the nozzles 52*a*, 52*b* and forms a suspension 56. A multifluid nozzle through which carrier medium 48 and carbon nanotube material 22 are conveyed simultaneously, in particular concentrically, is particularly advantageously used. A suspension 56 is formed quickly and uniformly in this way.

Subsequently, repeated contact of carbon nanotube material 22 and carrier medium 48 with the matrix material 18 occurs. The liquid bridges of the carrier medium 48 lead to coalescence of the matrix materials 18. At the same time, the carrier medium 48 vaporizes while the materials travel along the flight paths. Granulation of precursor material 10 occurs here.

The composition of the suspension 56 can be finely adjusted and varied by variation of the mass flows of the carbon nanotube material 22 and of the carrier medium 48 relative to one another, even during the process. A variation can be implemented particularly advantageously when the carbon nanotube material 22 is present in deagglomerated form in a fluid without polymer binder and is transported through the nozzle 52*a* and additional solvent with a polymer binder can be additionally introduced through the second nozzle 52*b*. This makes it possible for the agglomerates/precursors at the commencement of the process, i.e. in the interior of the granules, to have a different polymer content than in the outer layer at the end of the process. This can be advantageous when, for example, an electrolyte salt added later is to dissolve quickly in the polymer.

(Dry) air or another gas can optionally be blown in through the perforated plate 46, so that the matrix material

18 present thereon is loosened and becomes suspended in the stream of air. The matrix material 18 swirls in the fluidized bed. The advantage here is that the nozzles 52*a* and 52*b* can now be operated with very small flows. In this way, it is possible to bring a high content of matrix material 18 and only very little carbon nanotube material 22 into contact with one another.

In a working example which is not shown, the carrier medium 48 and the carbon nanotube material 22 are injected from below by means of two nozzles which are arranged at an angle of 45°.

FIG. 3 shows a second working example of the process of the invention for producing the precursor material 10. This process differs from the process in the first working example in that the carbon nanotube material 22 has been suspended and deagglomerated in the carrier medium 48 before introduction into the fluidized bed 40; the concentration of the carbon nanotube material 22 in the carrier medium 48 is therefore fixed beforehand. This results in formation of a suspension 56 which is introduced through a single nozzle 52*a* into the fluidized bed 40. In the fluidized bed 40, the suspension 56 is applied to the matrix material 18 so that the latter is granulated. The precursor material 10 formed in this way can subsequently be taken from the fluidized-bed reactor 44.

What is claimed is:

1. A process for producing a precursor material (10) for an electrochemical cell, wherein the process comprises the steps:

introduction of a matrix material (18) into a fluidized bed (40), and introduction of a carrier medium (48) and a deagglomerated carbon nanotube material (22) into the fluidized bed (40) so that the carbon nanotube material (22) is applied together with the carrier medium (48) to the matrix material (18) and the latter is granulated therewith, where the carbon nanotube material (22) has been suspended and deagglomerated in the carrier medium (48) before introduction and/or the carbon nanotube material (22) present in deagglomerated form in the fluidized bed (40) dissolves with the carrier medium (48) in the fluidized bed (40).

2. The process as claimed in claim 1, wherein active material particles or solid particles are used as matrix material (18).

3. The process as claimed in claim 1, wherein at least one polymer and/or a binder is dissolved in the carrier medium (48) before introduction.

4. The process as claimed in claim 3, wherein an electrolyte salt is dissolved together with the at least one polymer in the carrier medium (48) before introduction.

5. The process as claimed in claim 3, wherein an electrolyte salt is added during or after granulation.

6. The process as claimed in claim 1, wherein a surface (30) of the carbon nanotube material (22) and of the matrix material (18) is modified before introduction into the fluidized bed (40).

7. The process as claimed in claim 1, wherein a further amount of polymer is added after granulation.

8. The process as claimed in claim 1, wherein the carbon nanotube material (22) has been suspended and deagglomerated in the carrier medium (48) before introduction.

9. The process as claimed in claim 1, wherein the carbon nanotube material (22) present in deagglomerated form in the fluidized bed (40) dissolves with the carrier medium (48) in the fluidized bed (40).

10. The process as claimed in claim 1, wherein the carbon nanotube material (22) has been suspended and deagglomerated in the carrier medium (48) before introduction and the carbon nanotube material (22) present in deagglomerated form in the fluidized bed (40) dissolves with the carrier medium (48) in the fluidized bed (40).

* * * * *